Figure 7:
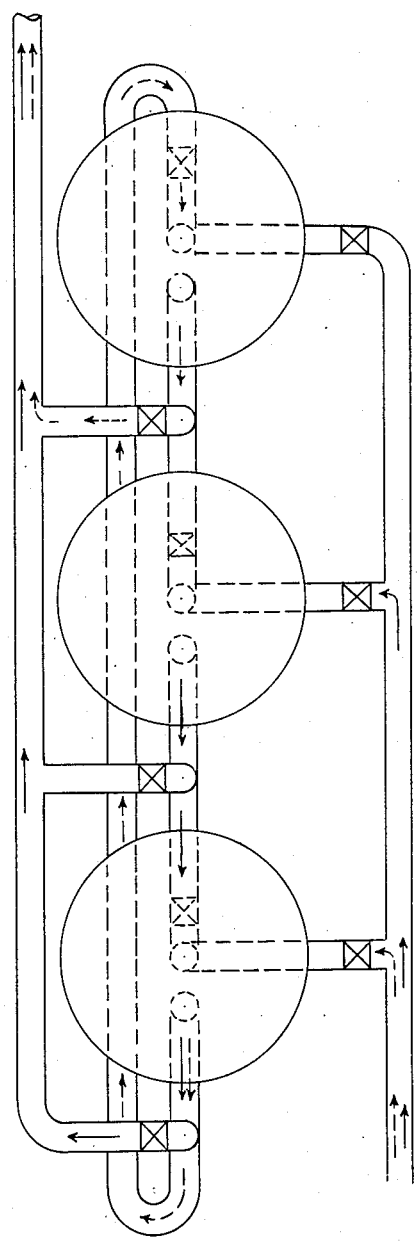

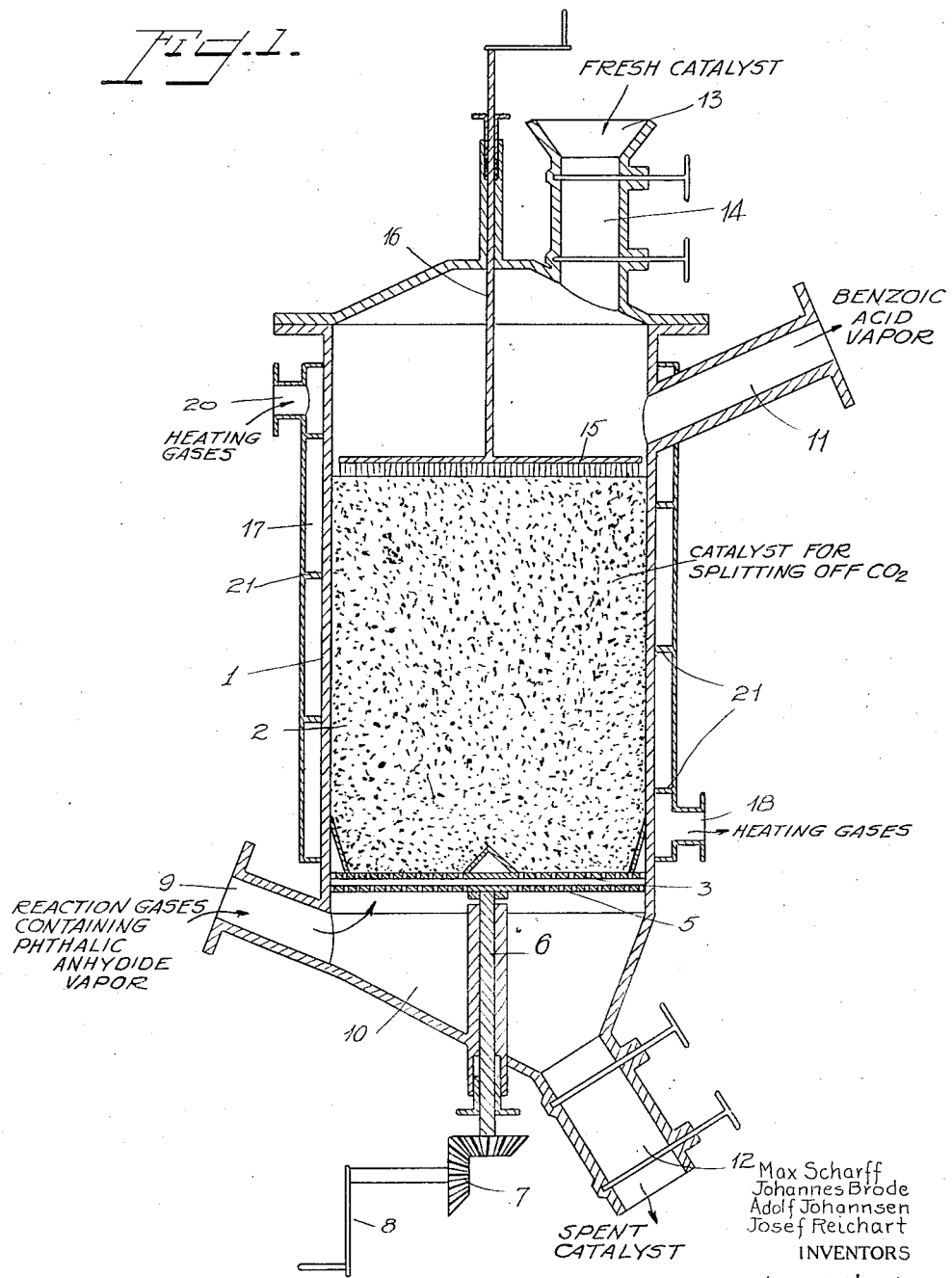

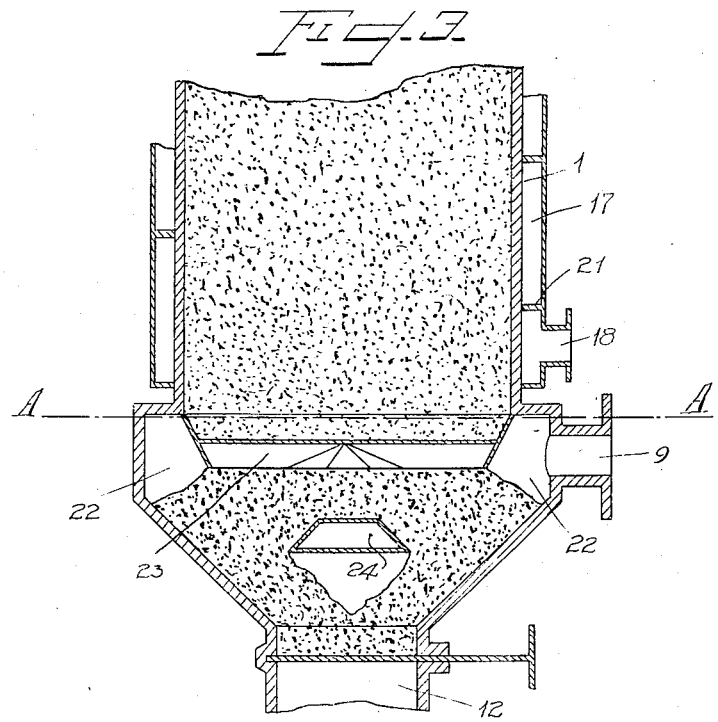
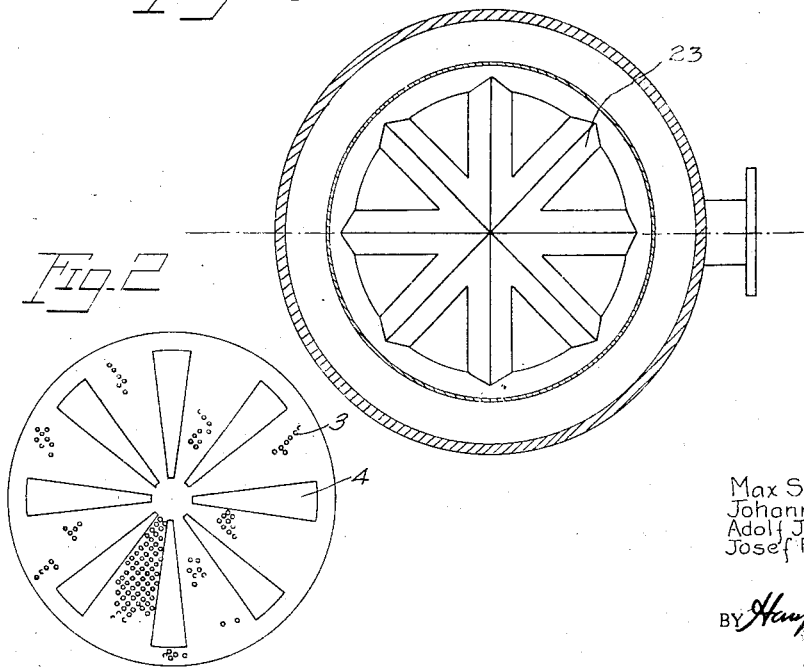

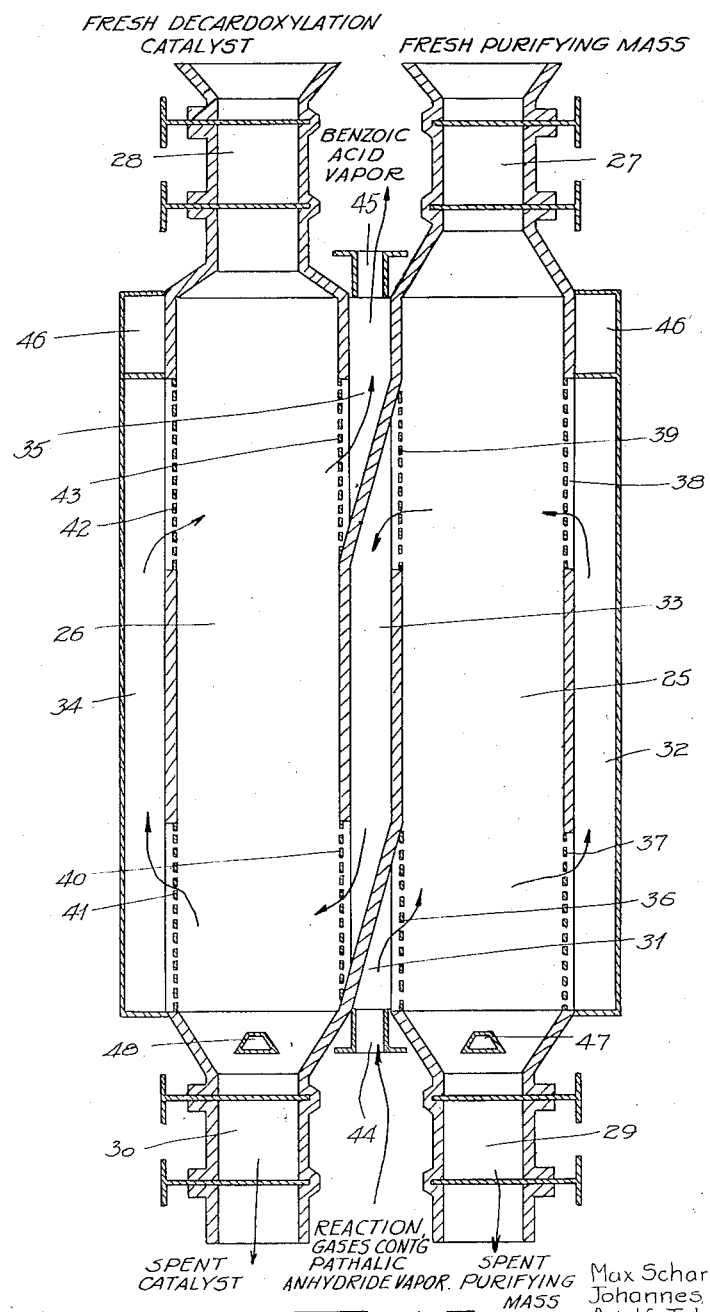

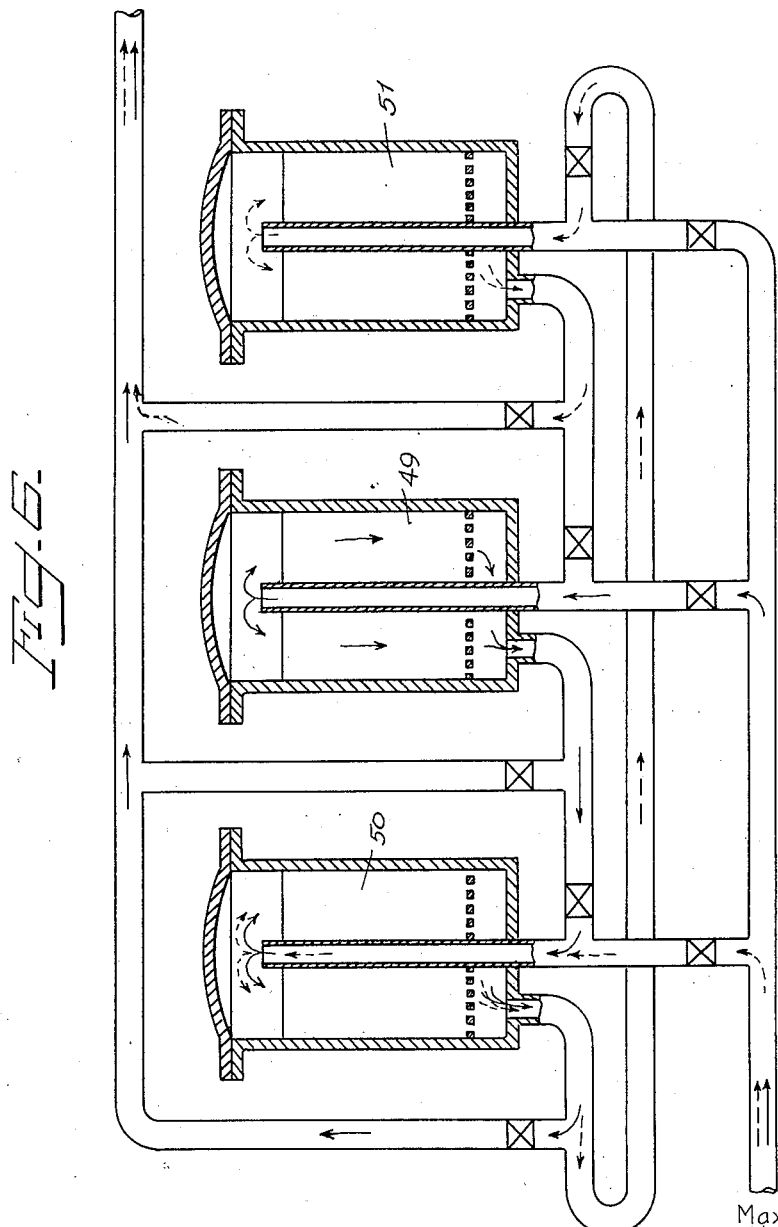

Jan. 22, 1935. M. SCHARFF ET AL 1,988,876
PRODUCTION OF BENZOIC ACID
Filed Aug. 14, 1929 5 Sheets-Sheet 5

INVENTORS
Max Scharff
Johannes Brode
Adolf Johannsen
Josef Reichart

By Hauff & Warland.
Attorneys

Patented Jan. 22, 1935

1,988,876

UNITED STATES PATENT OFFICE 1,988,876

PRODUCTION OF BENZOIC ACID

Max Scharff and Johannes Brode, Ludwigshafen-on-the-Rhine, Adolf Johannsen, Mannheim, and Josef Reichart, Ludwigshafen-on-the-Rhine, Germany, assignors to I. G. Farbenindustrie Aktiengesellschaft, Frankfort-on-the-Main, Germany, a corporation of Germany.

Application August 14, 1929, Serial No. 385,859

5 Claims. (Cl. 260—108)

The present invention relates to the conversion of naphthalene into phthalic anhydride by catalytic oxidation and also to the conversion into benzoic acid of the phthalic anhydride thus obtained without an intermediary separation. More particularly the invention relates to apparatus for purifying the phthalic anhydride, thus rendering it possible to separate it in a pure state, which apparatus may also be used for the treatment of the phthalic anhydride vapours with a catalyst splitting off carbon dioxide, whereby the phthalic anhydride is converted into benzoic acid. Catalysts suitable for this conversion into benzoic acid are described and claimed in the application for patent by Johannes Brode and Adolf Johannsen, Ser. No. 149,520, filed November 19, 1926, now Patent No. 1,955,050 of April 17, 1934, and the application for patent by Adolf Johannsen, Ser. No. 385,966 filed August 14, 1929. The process for the purification of phthalic anhydride is generically described and claimed in the U. S. Patent No. 1,693,915, granted December 4, 1928, to Johannes Brode and Adolf Johannsen. A specific method of making benzoic acid, in which the gas mixture containing phthalic anhydride is first passed over a purifying mass or over a catalyst for making benzoic acid, which is poisoned and thereby reduced in its activity, forms the subject-matter of the application for patent by Johannes Brode and Adolf Johannsen, Ser. No. 271,972, filed April 21, 1928, now Patent No. 1,889,945 of December 6, 1932.

We shall now describe our invention by reference to the production of benzoic acid from phthalic anhydride.

While the production of phthalic anhydride by the catalytic oxdiation of naphthalene is a highly exothermic reaction, the conversion of the phthalic anhydride into benzoic acid proceeds with only a slight disengagement of heat. Since the gases leaving the oxidation catalyst are directly subjected to the treatment with the catalyst splitting off carbon dioxide, the phthalic anhydride is in a highly diluted state and the increase in temperature in this diluted condition is only about 20° C. when the reaction proceeds adiabatically. The most favourable temperature for the conversion into benzoic acid is slightly lower than that required for the catalytic oxidation of naphthalene and it is therefore possible to pass the gases leaving the oxidation catalyst with a temperature of about 400° C. over the catalyst capable of splitting off carbon dioxide directly or after slightly cooling them, which does not present any difficulties in practice. Means for controlling the temperature during the decarboxylation need not be provided, but the gases can be brought to reaction in a simple vessel filled with the catalyst, for example in an apparatus somewhat similar in appearance to a shaft furnace.

The conversion of the phthalic anhydride into benzoic acid is, however, attended with the difficulty that the catalysts are very liable to poisoning by sulphuric acid vapours which are formed in the oxidation by the combustion of organic impurities containing sulphur which are present in commercial napthalene. As has been pointed out in the said application Ser. No. 271,972, this poisoning action of the gases is counteracted by first contacting the gases with a catalyst which has already been poisoned to some extent by sulphuric acid, but which is still capable of taking up considerable amounts of sulphuric acid, and only then contacting the gases with fresh catalyst. This process is preferably carried out by conducting the catalyst in a counter current to the gases either continuously or periodically. In the same way highly active catalysts of high value can be protected by first passing the gases through masses which have a substantially lower catalytic activity and are much cheaper and which take up the sulphuric acid. Examples of such purifying masses are, for example, pumice granules, zeolites and the like. In such processes it is advantageous to pass at least the purifying masses in counter current to the gases and our invention relates more particularly to apparatus for conducting the catalyst or purifying masses in counter current to the gases in a reliable manner.

Our invention will be fully described with reference to the accompanying diagrammatical drawings which show some forms of apparatus suitable for carrying out our invention. In the said drawings Figure 1 represents a vertical section through one form of apparatus. Figure 2 represents a plan view of one structural element of the apparatus shown in Figure 1. Figure 3 illustrates a modified form of apparatus and Figure 4 is a cross-section on the line A—A, Figure 3. Figure 5 represents a vertical section through another form of apparatus suitable for carrying out the aforesaid processes and Figure 6 relates to still another modification also shown in vertical section, whereas Figure 7 is a plan view of the arrangement shown in Figure 6.

Referring first to the modification shown in Figure 1, 1 is a cylindrical vessel which is filled with a catalyst 2. The catalyst is supported by a sieve-plate 3 which is shown in detail in Figure 2. As will be seen from said Figure 2, the said sieve-plate is provided with a number of large sector-shaped holes 4. Below the said sieve-plate 3 there is rotatably arranged a similar sieve-plate 5 also provided with sector-shaped holes. The said sieve-plate 5 can be rotated around the axle 6 by means of the gear-wheels 7 and the handle 8. When the apparatus is in use the two sieve-plates 3 and 5 are usually so positioned that the sector-shaped holes of the one plate do not coincide with those of the other plate, that is the two plates form a substantially continuous sieve supporting the catalyst. The gases are admitted by a tube 9 and pass from the chamber 10 through the said sieves and through the catalyst. They are withdrawn from the upper part of the vessel 1 by a tube 11. When the catalyst is to be removed from above the sieves, the lower sieve 5 is turned so that the sector-shaped holes in the one of the plates coincide with those in the other and the catalyst particles fall down into the chamber 10 where they collect and from which they can be withdrawn by means of the sluice 12. Fresh catalyst is supplied into the reaction vessel by means of a hopper 13 and a sluice 14. In order to impart the layer of catalyst a uniform level within the vessel 1 a steel-brush 15 is arranged therein which can be rotated around the axle 16. Preferably the sluice 14 is provided with an electric heating device which is not not shown in the drawings and by which the fresh catalyst is heated so far as to avoid condensation of phthalic anhydride or benzoic acid on its surface. It will be seen that in the said construction the used catalyst, which is poisoned to some extent by sulphuric acid vapours, is always maintained in the lower portion of the vessel 1 and is brought into contact with the gases first. Only the purified gases come into contact with the fresh catalyst present in the upper part of the vessel 1. The said vessel 1 is surrounded by a chamber 17 which serves for heating the vessel and catalyst when putting the apparatus into operation. A heating medium, for example hot combustion gases or heated air can be admitted into said chamber 17 by means of the tube 18 and withdrawn therefrom by the tube 20. The said chamber 17 is provided with a spiral-shaped partition 21, whereby the heating gas is compelled to travel a screw-shaped path.

It will be understood without further explanation that the apparatus described may be modified in a great variety of ways without departing from the scope of our invention. For example, the sieve-plates 3 and 5 may be provided with openings of another shape than that of a sector, for example, they may have a circular or elliptical shape. Further the lower plate 5 need not be rotated, but the large holes in the two sieve-plates may also be brought to coincide by moving the plate 5 in a linear direction.

Sieve-plate systems constructed similar to a Venetian blind may also be used.

Referring to Figures 3 and 4, Figure 3 illustrates a vertical section through the lower part of an apparatus which in its upper part is similar to that described in Figure 1. Corresponding parts of the apparatus shown in Figures 1 and 3 are indicated by the same reference numbers. In the device shown in Figure 3 the reaction gases are admitted by the tube 9 and are divided throughout the catalyst by means of the annular chamber 22 which is free from catalyst and from which they are admitted to below a number of Λ-shaped metal plates 23 which serve for dividing them throughout the catalyst. The spent catalyst is withdrawn by means of the sluice 12, similar to the arrangement shown in Figure 1. In order to prevent the catalyst in the vessel 1 from falling more rapidly in the center of the vessel than it does near the outside thereof, we prefer to arrange in the lower part of the vessel a stopping device 24 which may be made of sheetmetal, for example, and offers a certain resistance to the downwardly directed flow of catalyst in the center of the vessel.

Referring now to the modification illustrated in Figure 5, this apparatus allows of employing two different catalysts, or of one catalyst and a purifying mass, the gases being passed first through the purifying mass and then through the catalyst. The said apparatus consists of two vertically arranged shafts 25 and 26 which may be, for example, of rectangular or square cross-section. Each of the said chambers is provided with sluices 27 and 28 at the upper ends and 29 and 30 at the lower ends, which serve for supplying the fresh catalyst or purifying mass and for withdrawing the spent masses while the apparatus is in operation. On both sides of the said chambers and also between them there are arranged narrow chambers 31, 32, 33, 34 and 35 which are connected with the shaft by the sieve-plates 36, 37, 38, 39, 40, 41, 42, and 43. The gases to be treated are admitted into the chamber 31 by means of the tube 44 and pass through the sieve-plate 36 into the chamber 25. They pass therethrough in horizontal direction and then by the sieve-plate 37 into the chamber 32. From this chamber they pass through the sieve-plate 38 and again in the horizontal direction through the mass or catalyst in the chamber 25 and leave the chamber by way of the sieve-plate 39 and the chamber 33. They next enter the chamber 26 by way of the sieve-plate 40, pass through the mass in said chamber again in the horizontal direction, next enter the chamber 34 by way of the sieve-plate 41 and then pass through the sieve-plate 42 again into the mass contained in the chamber 26 in the horizontal direction and are withdrawn by way of the sieve-plate 43, the chamber 35 and the tube 45. The horizontal distance between each pair of sieve-plates 36 and 37, 38 and 39, 40 and 41, 42 and 43, respectively, is smaller than the vertical distance between each two sieve-plates 36 and 39, 37 and 38, 40 and 43, 41 and 42, respectively, and therefore the gases pass mainly in the horizontal direction through the catalyst or purifying mass, since this direction offers the lowest resistance to the gases. Means may also be provided for passing the gas leaving the chamber 36 first through an annular chamber 46 surrounding the upper parts of the chambers 25 and 26, whereby the fresh catalyst or purifying mass is preheated. In the lower part of the chambers 25 and 26, there are provided resistance devices 47 and 48 which prevent the catalyst or purifying mass from falling more rapidly in the center of each chamber than at the outside thereof. When the apparatus is put into operation, it may be heated by passing through hot air, or any suitable heating devices may be provided in the chambers 32 and 34.

Referring now to the modification shown in Figures 6 and 7, the essence thereof is the arrangement of three vertical chambers 49, 50 and 51 filled with the catalyst of which two chambers are in operation at a time while the third one is disconnected and supplied with fresh catalyst. Assuming for the sake of explanation that the chambers 49 and 50 are in operation, the flow of the gases is indicated by means of the arrows and will require no further explanation. As soon as it is noted from the composition of the gases leaving the plant that the catalyst becomes somewhat poisoned and is therefore reduced in its efficiency, the chamber 49 is shut off and the gases are passed first through the chamber 50 and then through the chamber 51 which is provided with fresh catalyst. The flow of the gases which is now established is indicated by the arrows in dotted lines. When the catalyst in the tower 50 has now become exhausted, the path of the gases is again rearranged in that the gases are now passed first through the chamber 51 and then through the chamber 49 which in the meantime has been filled with fresh catalyst. While in the arrangement shown in Figures 6 and 7 the catalyst chambers are provided in linear arrangement it is usually more advisable to arrange them at the corners of a triangle, since thereby the pipings connecting the chambers with each other become as short as possible so that losses of heat are avoided as far as possible. The said chambers may be heated before being put into operation in any suitable manner and the provision of means therefor will not present any difficulties. In the same way an arrangement may be made containing more than three chambers, for example four or even more chambers which are arranged according to the same principle and of which one is shut off at any time for replacing the spent portion of catalyst.

It may be noted here that all apparatus described in the foregoing are provided with a heat insulation in order to prevent losses of heat. This insulation is not shown in the drawings for the sake of greater clearness. Also the apparatus are provided with means for controlling the temperature which are also not shown in the drawings.

In the same way as hereinbefore described for the production of benzoic acid, the apparatus may be used for the purification of phthalic anhydride by contact with solid masses absorbing sulphur compounds, as for example pumice stone, silica gel, zeolites, bauxite and the like. In such case the gases leaving the oxidation catalyst are cooled before entering the purification apparatus so far that no catalytic action of the purifying masses takes place. In this connection it may be pointed out that the said purifying masses possess to a small extent the property of splitting off carbon dioxide and of producing benzoic acid when used at high temperatures. Further the power of the said masses of absorbing sulphuric acid is higher at lower temperatures. However, the temperatures should not be so low that separation of the phthalic anhydride vapours contained in the gases takes place and the most suitable temperature is therefore about 200° C. By the separation of the sulphuric acid the formation of dark coloured condensation products of alpha-naphthoquinone during the separation of the phthalic anhydride is prevented. The small amounts of alpha-naphthoquinone present in the gases are separated only on extensive cooling together with the last traces of phthalic anhydride, whereas the bulk of the latter is separated as a pure white crystalline mass or powder of excellent purity.

What we claim is:

1. The process of producing benzoic acid which comprises passing the gas mixture, resulting from the catalytic oxidation of naphthalene to phthalic anhydride, directly over a catalyst splitting off carbon dioxide moved in counter-current to the gases.

2. The process of producing benzoic acid which comprises passing the gas mixture, resulting from the catalytic oxidation of naphthalene to phthalic anhydride, directly in an upward direction through a vessel through which a catalyst splitting off carbon dioxide is moved in a counter-current to the gases.

3. The process of producing benzoic acid which comprises passing the gas mixture, resulting from the catalytic oxidation of naphthalene to phthalic anhydride, directly over a mass capable of absorbing sulphuric acid vapors and not altering its shape or capable of giving rise to further conversion and contamination of the desired reaction product under the conditions of working and then over a catalyst splitting off carbon dioxide, both masses being moved in counter-current to the gases.

4. The process of producing benzoic acid which comprises passing the gas mixture, resulting from the catalytic oxidation of naphthalene to phthalic anhydride, directly in an upward direction through a vessel through which a mass capable of absorbing sulphuric acid vapors and not altering its shape or capable of giving rise to further conversion and contamination of the desired reaction product under the conditions of working is moved in counter-current and then in an upward direction through another vessel through which a catalyst splitting off carbon dioxide is moved in counter-current to the gases.

5. The process of producing benzoic acid which comprises passing the gas mixture, resulting from the catalytic oxidation of naphthalene to phthalic anhydride, directly through a series of reaction vessels each of which is filled with a catalyst splitting off carbon dioxide, the contamination of said catalyst by sulphuric acid decreasing from the first to the last vessel in said series, until the catalyst in the first vessel is completely spent, then disconnecting said first vessel, arranging another vessel filled with fresh catalyst as the last of the series, and repeating said steps.

MAX SCHARFF.
JOHANNES BRODE.
ADOLF JOHANNSEN.
JOSEF REICHART.